(12) United States Patent
Artelsmair (10) Patent No.: US 8,124,913 B2
(45) Date of Patent: Feb. 28, 2012

(54) METHOD FOR CONTROLLING AND/OR ADJUSTING A WELDING PROCESS AND WELDING DEVICE FOR CARRYING OUT A WELDING PROCESS

(75) Inventor: Josef Artelsmair, Wartberg/Krems (DE)

(73) Assignee: Fronius International GmbH, Pettenbach (AT)

( * ) Notice: Subject to any disclaimer, the term of this patent is extended or adjusted under 35 U.S.C. 154(b) by 943 days.

(21) Appl. No.: 10/574,401

(22) PCT Filed: Oct. 21, 2004

(86) PCT No.: PCT/AT2004/000363
§ 371 (c)(1),
(2), (4) Date: Apr. 3, 2006

(87) PCT Pub. No.: WO2005/042199
PCT Pub. Date: May 12, 2005

(65) Prior Publication Data
US 2007/0056944 A1 Mar. 15, 2007

(30) Foreign Application Priority Data
Oct. 23, 2003 (AT) ................................ A 1688/2003

(51) Int. Cl.
*B23K 9/10* (2006.01)
(52) U.S. Cl. .......... 219/130.21; 219/130.32; 219/137.71
(58) Field of Classification Search ............... 219/130.1, 219/130.21, 130.31–130.33, 136, 137 R, 219/137.2, 137.5, 137.7, 137.71, 132, 31, 219/32, 33, 1, 21, 4, 5, 51, 137 PS
See application file for complete search history.

(56) References Cited

U.S. PATENT DOCUMENTS

| 4,100,389 | A | * | 7/1978 | Tanaka et al. ................... 219/74 |
| 5,508,493 | A | * | 4/1996 | Ueyama et al. .......... 219/130.51 |
| 6,315,186 | B1 | * | 11/2001 | Friedl et al. ................... 228/102 |
| 6,384,376 | B1 | * | 5/2002 | Plottier et al. ........... 219/130.51 |
| 6,476,354 | B1 | * | 11/2002 | Jank et al. ............... 219/137 PS |

(Continued)

FOREIGN PATENT DOCUMENTS

DE 19 19 464 10/1969

(Continued)

OTHER PUBLICATIONS

International Search Report.

(Continued)

*Primary Examiner* — Henry Yeun
*Assistant Examiner* — Hung Nguyen
(74) *Attorney, Agent, or Firm* — Collard & Roe, P.C.

(57) ABSTRACT

A method for controlling and/or adjusting a welding process, uses a melting electrode, wherein after ignition of an electric arc, a welding process, which is adjusted on the basis of several different welding parameters, is carried out using a welding current source, the process being controlled or adjusted by a control device. Also a corresponding welding device is used to carry out the process. In order to create the method, wherein the thermal heat economy is adjusted and/or regulated and/or controlled in order to introduce heat into the workpiece, at least two different process phases are cyclically combined, the process phases having different inputs of energy via different material transitions and/or arc types, such as a pulse current phase and a cold metal transfer phase in order to influence or control thermal heat economy, particularly the introduction of heat into the workpiece to be processed.

27 Claims, 4 Drawing Sheets

U.S. PATENT DOCUMENTS

| | | | |
|---|---|---|---|
| 6,479,793 B1* | 11/2002 | Wittmann et al. | 219/130.5 |
| 6,515,259 B1* | 2/2003 | Hsu et al. | 219/130.51 |
| 6,717,107 B1* | 4/2004 | Hsu | 219/130.51 |
| 2002/0008095 A1* | 1/2002 | Norrish et al. | 219/137 PS |
| 2002/0153363 A1 | 10/2002 | Hiraoka et al. | |
| 2004/0016788 A1* | 1/2004 | Huismann et al. | 226/115 |
| 2004/0069759 A1* | 4/2004 | Davidson et al. | 219/130.5 |

FOREIGN PATENT DOCUMENTS

| | | |
|---|---|---|
| DE | 42 28 589 | 3/1994 |
| DE | 197 38 785 | 4/1999 |
| EP | 0 478 796 | 4/1992 |
| GB | 1 245 589 | 9/1971 |
| JP | 60-187468 | 9/1985 |
| JP | 60-199573 | 10/1985 |
| JP | 60 255276 | 12/1985 |
| JP | 04-197579 | 1/1995 |
| JP | 07 009149 | 1/1995 |
| SU | 1 299 730 | 3/1987 |
| WO | WO 00/64620 | 11/2000 |

OTHER PUBLICATIONS

Schmidt K-P: "New Regulation System for Double-Pulse Gas-Shielded Metal-Arc Welding"—Welding and Cutting, Deutscher Verlag Fuer Schweisstechnik, Dusseldorf, DE, No. 3, 2002, p. 117, XP001161394.

Schmidt K-P: "New Regulation System for Double-Pulse Gas-Shielded Metal-Arc Welding"—Welding and Cutting, Deutscher Verlag Fuer Schweisstechnik, Dusseldorf, DE, No. 3, 2002, p. 117, XP001161394 (to follow).

Japanese Examination Report with English translation of Grounds of Rejection.

* cited by examiner

Fig. 10

METHOD FOR CONTROLLING AND/OR ADJUSTING A WELDING PROCESS AND WELDING DEVICE FOR CARRYING OUT A WELDING PROCESS

CROSS REFERENCE TO RELATED APPLICATIONS

Applicants claim priority under 35 U.S.C. §119 of Austrian Patent Application No. A 1688/2003 filed Oct. 23, 2003. Applicants also claim priority under 35 U.S.C. §365 of PCT/AT2004/000363 filed Oct. 21, 2004. The international application under PCT article 21(2) was not published in English.

BACKGROUND OF THE INVENTION

1. Field of the Invention

The invention relates to a method for controlling a welding process or a welding current source using a consumable electrode, in which a welding process adjusted on the basis of several different welding parameters and controlled by a control device is carried out by a welding current source after the ignition of an electric arc.

The invention further relates to a welding apparatus including a welding current source, a control device and a welding torch, wherein different welding parameters are adjustable via an input and/or output device provided on the welding apparatus, or via a remote controller.

2. Description of Related Art

In the known welding processes, all parameters are adjustable via an input and/or output device provided on the welding apparatus. In doing so, an appropriate welding process such as, for instance, a pulse welding process or a spray-arc welding process or a short-arc welding process is selected and the parameters are adjusted accordingly. In addition, it is frequently also possible to select an appropriate ignition process for igniting the electric arc. If the welding procedure is then started, the adjusted welding process, for instance a pulse welding process, will be carried out upon ignition of the electric arc by the adjusted ignition process. In doing so, it is possible to vary the different parameters such as, for instance, welding current, wire advance speed etc., for this selected welding process during the welding procedure. Switching to another welding process, for instance a spray-arc welding process, is, however, not feasible. In that case, the just performed welding process, for instance a pulse welding process, must be interrupted and another welding process, for instance a spray-arc welding process, must be initiated by accordingly making a new selection or adjustment at the welding apparatus.

US 2002/153363 A1 relates to a welding method that allows even extremely narrow welding gaps to be optimally bridged and good welding qualities to be achieved. To this end, the melting rate of the welding wire in respect to the conveying speed is changed to enable the control of the heat distribution of the changing the welding parameters such as the welding current or the wire conveying speed.

U.S. Pat. No. 6,515,259 B1 is directed to a welding method for aluminum, in which the heat of the electric arc is controlled via welding parameters such as the pulse form, pulse width or leading edge of the welding current. This serves to improve the welding quality in aluminum welding.

Finally, JP 04-197579 A discloses a welding method in which preheating of the material by a current fed through the welding wire takes place in the starting phase prior to the generation of the electric arc. The described method merely refers to the starting phase of the welding process.

SUMMARY OF THE INVENTION

It is the object of the present invention to provide an above-mentioned method for controlling a welding process and a welding current source, respectively, which enables the adjustment and/or control of the heat balance for the introduction of heat into the workpiece.

Another object of the present invention resides in providing an above-mentioned welding apparatus, which enables the adjustment and/or control of the heat balance for the introduction of heat into the workpiece.

The first object of the invention is achieved in that at least two different welding process phases having different energy inputs resulting from different material transitions and/or electric arc types are cyclically combined during the welding process to influence or control the heat balance and, in particular, the heat input into the workpiece to be worked. The advantage resides in that the selective cyclic combination of the most different welding process phases allows the control of the heat balance and, in particular, the input of heat into the workpiece. Thus, a welding process phase comprising, for instance, several pulses of a pulse welding process may be followed by a welding process phase of a cold-metal-transfer welding process, in which the welding wire is moved until contacting the workpiece, i.e. the melt bath, and the droplet detachment occurs at a retraction of the welding wire from the melt bath. During this cold-metal-transfer welding phase, substantially less energy and, hence, a lower welding temperature are, thus, introduced into the workpiece, i.e. the melt bath, than has been being comprised of different welding process phases which are cyclically combined or alternated, the heat balance and, in particular, the heat input into the workpiece can be controlled. By a reduced heat input into the workpiece, particularly sheet metals to be welded, the distortion of a workpiece will, for instance, be substantially reduced. Another advantage resides in that the welding process can be adapted to the workpiece requirements in an optimum manner by the user due to the heat input being adjustable via the welding installation.

In this respect, the different welding process phases during a welding process are, in particular, comprised of at least one welding process phase having a high energy input and one welding process phase having a low energy input, which are cyclically combined. The heat balance can, thus, be selectively controlled.

However, the configurations according to claims 3 to 5, according to which the welding process phases are comprised of commercially available welding processes and the simple control of the heat balance is feasible by applying a special welding process phase having a low energy and heat input, are advantageous too.

Yet, the configurations according to claims 6 to 8 are also advantageous, allowing a substantial reduction of the heat input into the workpiece by applying a cold-metal-transfer welding phase.

The advantage of the configuration according to claims 9 and 10 resides in that the ratio of the different welding process phases of the welding method according to the invention, i.e. the duration of a welding phase and/or the number of pulses in a welding phase, can be automatically varied by the control device as a function of the required heat input. With a larger sheet thickness of the workpiece, for instance, the ratio can be changed such that the welding process phase having a higher energy input is adjusted accordingly higher than with a workpiece having a smaller thickness.

Yet, also the configuration according to claims 11 to 13 is advantageous, since it enables the direct adjustment of the heat balance for the welding process by the user.

Also of advantage is the configuration according to claim 14, which uses a method known from the prior art, namely the so-ignite the electric arc. By such a contact ignition, the welding wire is placed on the workpiece and subsequently slightly lifted while connecting the welding current so as to cause the electric arc to ignite.

The variant according to claim 15 ensures the stabilization of the electric arc in a simple manner.

The advantage of the configuration according to claim 16 resides in that is provides cooling of the workpiece during the cold-metal-transfer welding phase, thus substantially reducing the overall heat input into the workpiece over the entire welding period.

A configuration according to claim 17 is, however, also advantageous, since it ensures a substantial acceleration of the welding process. In this manner, an implementation without a considerable time lag is, for instance, feasible in a base current phase of a pulse welding process.

The object of the invention is further achieved by an above-mentioned welding apparatus, wherein at least one parameter for the heat balance or the heat input into the workpiece to be worked is selectable at the input and/or output device of the welding apparatus and/or a remote controller, and/or an adjustment element is provided for the adjustment of the heat balance or heat input into the workpiece to be worked, via a cyclic combination of at least two welding process phases having different energy inputs.

Further advantageous configurations are described in claims 19 to 29. The advantages resulting therefrom are apparent from the description and the previously described claims 1 to 17.

BRIEF DESCRIPTION OF THE DRAWINGS

In the following, the invention will be explained in more detail by way of the attached drawings. Therein.

DETAILED DESCRIPTION OF PREFERRED EMBODIMENTS

Figure 1:
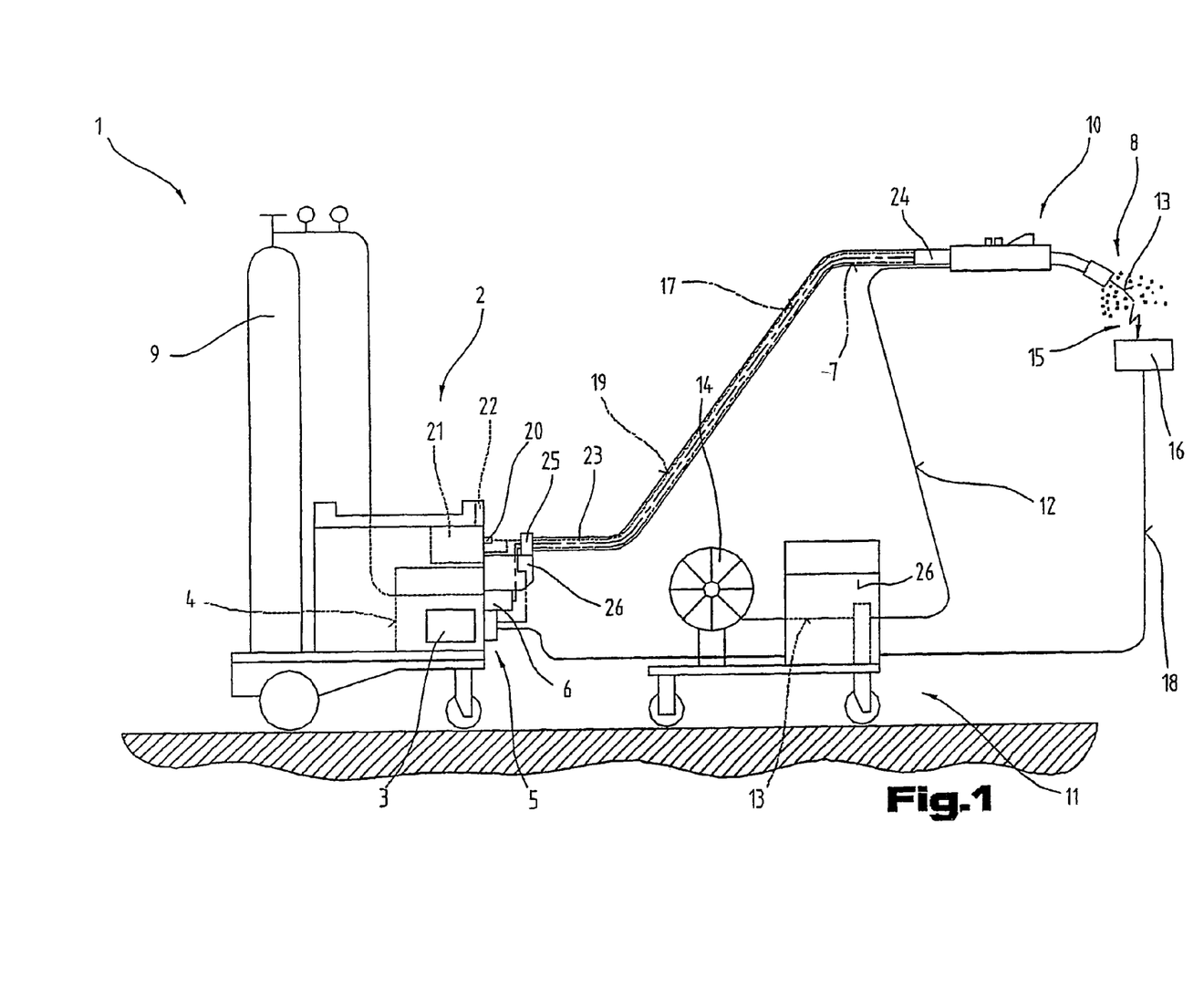
FIG. 1 is a schematic illustration of a welding machine or welding apparatus.

FIG. 1 depicts a welding apparatus 1, or welding installation, for various processes or methods such as, e.g., MIG/MAG welding or WIG/TIG welding, or electrode welding methods, double-wire/tandem welding methods, plasma or soldering methods etc.

The welding apparatus 1 comprises a power source 2 including a power element 3, a control device 4, and a switch member 5 associated with the power element 3 and control device 4, respectively. The switch member 5 and the control device 4 are connected with a control valve 6 arranged in a feed line 7 for a gas 8 and, in particular, a protective gas such as, for instance, carbon dioxide, helium or argon and the like, between a gas reservoir 9 and a welding torch 10 or torch.

In addition, a wire feeder 11 usually employed in MIG/MAG welding can be controlled by the control device 4, whereby an additional material or welding wire 13 is fed from a feed drum 14 or wire coil into the region of the welding torch 10 via a feed line 12. It is, of course, possible to integrate the wire feeder 11 in the welding apparatus 1 and, in particular, its basic housing, as is known from the prior art, rather than designing the same as an accessory device as illustrated in FIG. 1.

It is also feasible for the wire feeder 11 to feed the welding wire 13, or additional material, to the process site outside of the welding torch 10, to which end a non-consumable electrode is preferably arranged within the welding torch 10, as is usually the case with WIG/TIG welding.

The power required to build up an electric arc 15, in particular an operating electric arc, between the electrode and a workpiece 16 is supplied from the power element 3 of the power source 2 to the welding torch 10, in particular electrode, via a welding line 17, wherein the workpiece 16 to be welded, which is formed of several parts, is likewise connected with the welding apparatus 1 and, in particular, power source 2 via a further welding line 18, thus enabling a power circuit for a process to build up over the electric arc 15, or plasma jet formed.

To provide cooling of the welding torch 10, the welding torch 10 can be connected to a fluid reservoir, in particular a water reservoir 21, by a cooling circuit 19 via an interposed flow control 20, whereby the cooling circuit 19 and, in particular, a fluid pump used for a fluid contained in the water reservoir 21, is started as the welding torch 10 is put into operation so as to effect cooling of the welding torch 10.

The welding apparatus 1 further comprises an input and/or output device 22, via which the most different welding parameters, operating modes or welding programs of the welding apparatus 1 can be set and called, respectively. In doing so, the welding parameters, operating modes or welding programs set via the input and/or output device 22 are transmitted to the control device 4, which subsequently controls the individual components of the welding installation or welding apparatus 1 and/or predetermines the respective set values for controlling.

In the exemplary embodiment illustrated, the welding torch 10 is, furthermore, connected with the welding apparatus 1 or welding installation via a hose package 23. In the hose package 23, the individual lines from the welding apparatus 1 to the welding torch 10 are arranged. The hose package 23 is connected with the welding torch 10 via a coupling device 24, whereas the individual lines arranged in the hose package 23 are connected with the individual connections of the welding apparatus 1 via connection sockets or plug-in connections. In order to ensure an appropriate strain relief of the hose package 23, the hose package 23 is connected with a housing 26, in particular the basic housing of the welding apparatus 1, via a strain relief means 25. It is, of course, also possible to use the coupling device 24 for connection to the welding apparatus 1.

It should basically be noted that not all of the previously various welding methods or welding apparatus 1 such as, e.g., WIG devices or MIG/MAG apparatus or plasma devices. Thus, it is, for instance, feasible to devise the welding torch 10 as an aircooled welding torch 10.

Figure 2:
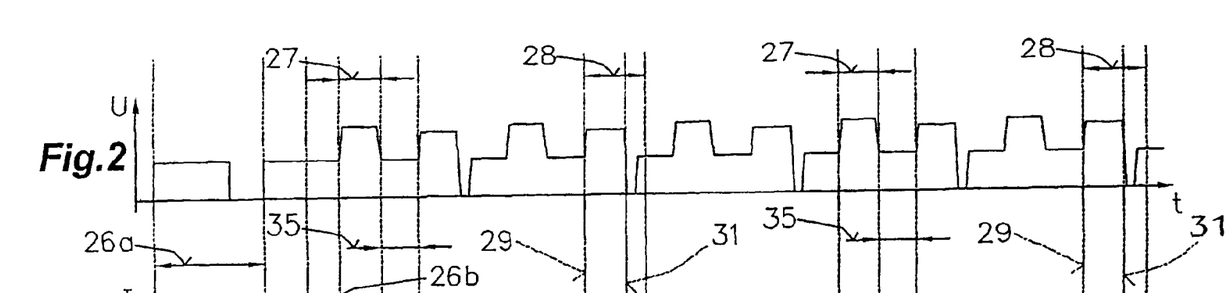
FIG. 2 illustrates the time history of the welding voltage of an example of the welding process according to the invention.
Figures 3, 4:
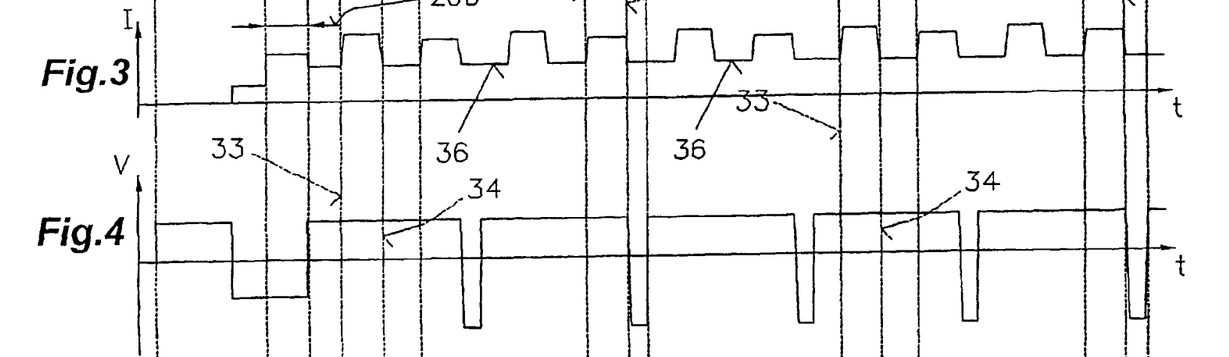
FIG. 3 illustrates the time history of the welding current for the welding voltage according to FIG. 2.
FIG. 4 illustrates the time history of the speed V of the welding wire in correspondence with the welding voltage course according to FIG. 2.
Figure 5:
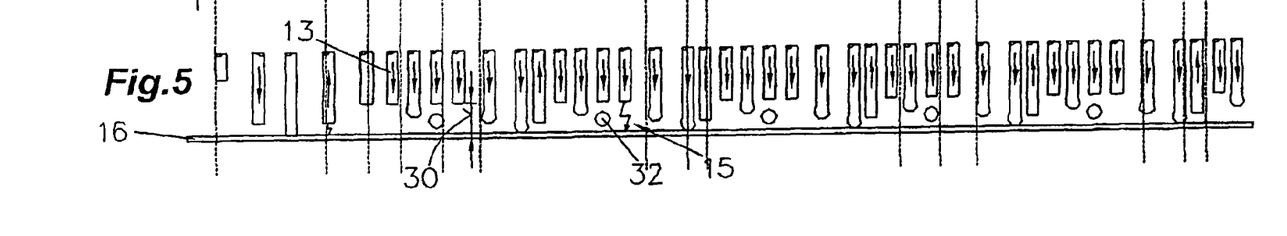
FIG. 5 illustrates the schematic position of the welding wire relative to the workpiece as a function of the time t in correspondence with the welding voltage according to FIG. 2.
Figure 6:
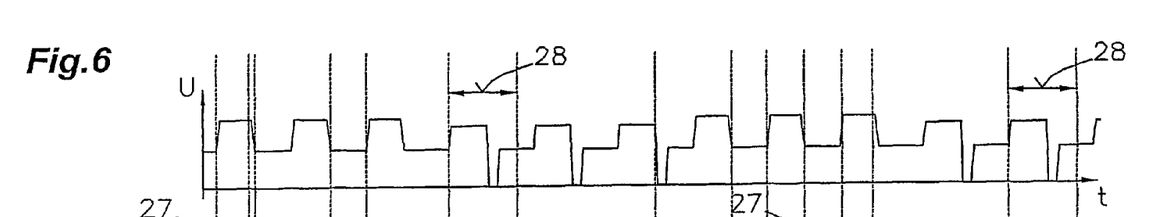
FIG. 6 shows the time history of the welding voltage U for another welding process configuration.
Figures 7, 8:
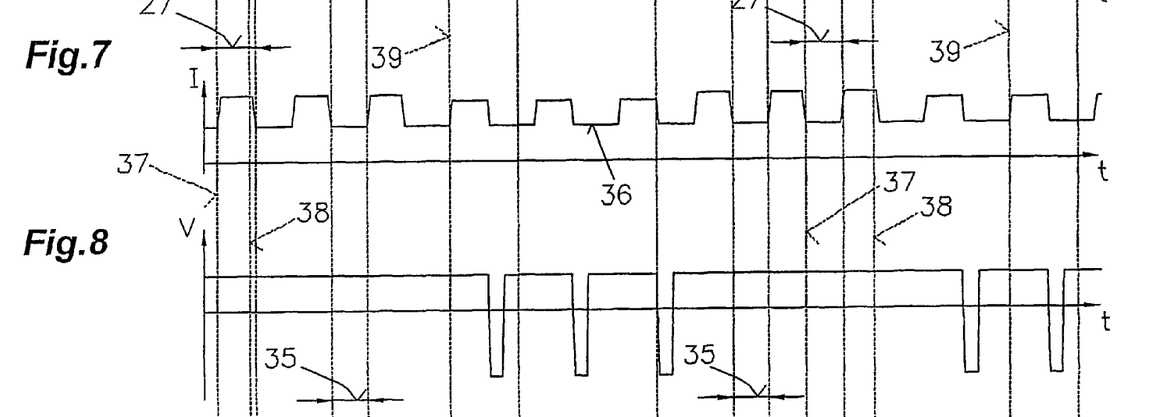
FIG. 7 shows the associated time history of the welding current I.
FIG. 8 shows the associated time history of the welding wire speed.
Figure 9:
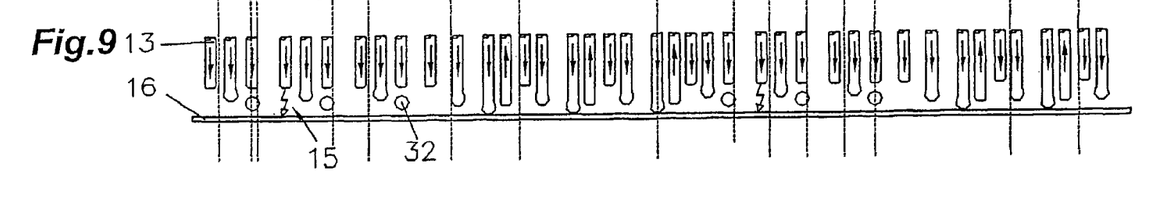
FIG. 9 illustrates the associated schematic position of the welding wire relative to the workpiece as a function of time.

FIGS. 2 to 5 schematically depict an exemplary embodiment of a welding process according to the invention, which is comprised of a cyclic combination, or alternation, of a common welding process phase, particularly pulse current phase, with a cold-metal-transfer phase. During the cold-metal-transfer phase, droplet detachment from the welding wire 13 likewise occurs. FIG. 2 shows the time history of the welding voltage U, FIG. 3 the time history of the welding current I, FIG. 4 the time history of the speed V of the welding wire 13, and FIG. 5 the schematic position of the welding wire 13 relative to the workpiece 16 as a function of the time t.

The starting procedure of the welding process according to the invention for igniting the electric arc 15 is, for instance, realized by what is called the lift-arc principle 26a. Thus, when starting the ignition procedure, the welding wire 13 is moved in the direction towards the workpiece 16 while, at the same time, a limitedly increased welding current I is applied to prevent an incipient melting of the welding wire 13 on the workpiece 16 at the first-time contact. At the first-time contact, i.e. at a short circuit, the welding current I is, for instance, once again increased to again prevent an incipient melting of the welding wire 13. During the backward movement of the welding wire 13, an electric arc 15 is generated as the former is lifted off the workpiece 16, and the welding wire 13 is moved to a predetermined distance from the workpiece 16 with a reversal of the wire conveying direction being effected once again.

After the ignition of the electric arc 15 it is also feasible, prior to the welding process proper, to carry out a first, short process phase 26b with an elevated energy input over a defined period and subsequently realize the welding process comprised of cyclically combined welding process phases. Hence results the advantage that this short process phase 26b with an elevated energy input causes the electric arc 15 to stabilize. Moreover, the welding wire 13 is heated by the ignition process, and the subsequent welding process can, therefore, be started hance the welding quality.

In the welding process according to the invention it is essential that the heat balance, in particular the heat input into a workpiece 16, is influenced and controlled by the cyclic combination of at least two different welding process phases comprising different material transitions and/or electric arc types. In said welding process, a welding process phase having a high energy input alternates with a welding process phase having a low energy input, in particular a cold-metal-transfer phase, in order to selectively control and influence the heat balance of the workpiece 16.

In the illustrated exemplary embodiment of the welding process according to FIGS. 2 to 5, a pulse current phase 27 is cyclically combined with a cold-metal-transfer phase 28. No detailed description of the pulse current phase 27 is given, since this is already known from the prior art. It should merely be mentioned that the pulse current phase 27 effects a droplet detachment from the welding wire 13 by the application of a current pulse and subsequently merges into the base current phase 35. Especially the use of the cyclic combination of a pulse current phase 27 with a cold-metal-transfer phase 28, enables the cold-metal-transfer phase 28 to be performed in the base current phase 35 of the pulse current phase, which means that the welding current I is lowered after the droplet detachment by the pulse current phase 27 and merges into the base current phase 35, after which the cold-metal-transfer phase 28 will then be carried out in the base current phase 35, whereupon a transition into the pulse current phase 27 will again take place.

As will be described in more detail below by way of FIGS. 6 to 9, it is possible to realize the cyclic combination of the different welding process phases by several consecutive, identical welding process phases of a welding process, for instance the pulse current phase, and carry out the at least one further welding process phase, for instance the cold-metal-transfer phase 28, once, or several consecutive times, only at a pregiven time.

During the cold-metal-transfer phase 28, the welding wire 13 is moved from a starting position, i.e. distance 30, in the direction towards the workpiece 16, as is apparent starting from workpiece 16 until contacting the workpiece 16 at time 31. After having created a short circuit, the wire conveyance is reversed and the welding wire 13 is again moved away from the workpiece 16 as far as to the predefined distance 30, which is preferably the starting position. In order to induce the formation of a droplet or the incipient melting of the end of the welding wire during the cold-metal-transfer phase 28 by carrying out the process during the base current phase 35 in the pulse welding process, the welding current I is changed, particularly increased, relative to the base current of the base current phase 35 during the forward movement of the welding wire 13 in the direction towards the workpiece 16, as is apparent at time 29. At an alternation of the cold-metal-transfer phase 28 with another welding process phase, the current I is controlled such that incipient melting will be caused at a forward movement of the welding wire 13. By the welding wire 13 being immersed into the melt bath and moved rearwards after this, the droplet 32, or slightly melted material, is detached from the welding wire 13 (not illustrated). In this case, it is, of course, also possible to effect a pulse-like increase in the welding wire I in order to promote droplet detachment.

It is, furthermore, feasible to change, particularly increase, the wire advance speed V during the cold-metal transfer phase 28 in order to ensure the rapid execution of the welding process in the cold-metal-transfer phase 28.

To sum up, the welding process in the exemplary embodiment according to FIGS. 2 to 5 proceeds in a manner that the pulse current phase 27 is initiated, i.e. the welding current I is increased, at a time 33, i.e. after the starting procedure, in order to cause the formation of a droplet on the end of the welding wire. The welding current I is maintained for a sufficiently long time to ensure the detachment of the droplet 32 from the welding wire 13. It is, of course, also possible to have the droplet 32 detached from the welding wire 13 by a short elevated current pulse I. After having completed the pulse current phase 27 according to time 34, the welding current I is lowered to a base value 36 in the base current phase 35, thus maintaining the electric arc 15. Subsequently, the cold-metal-transfer phase 28 is initiated after the expiration of a preadjustable period of cold-metal-transfer phase 28, the base current phase 35 is preferably further maintained over a pregiven period of time, whereupon a pulse current phase 27 is again initiated and a cyclic repetition of the two welding process phases is performed.

The heat balance can be substantially influenced by the combined welding process phases. This is realized in that the pulse energy, in particular the welding current I, is lower during the cold-metal-transfer phase 28 than the pulse energy, in particular the welding current I, during the pulse current phase 27. In detail, a very cold material transition is, thus, obtained during the cold-metal-transfer phase 28, since the droplet detachment is effected by applying a very low current necessary only to reignite the electric arc 15, so that only little heat is being introduced into the workpiece 16. As a result, appropriate cooling of the workpiece 16 is feasible to enable the control of the heat balance or heat input into the workpiece 16.

Another exemplary embodiment will be described by way of FIGS. 6 to 9. In this welding process, three consecutive pulse current phases 27 are followed by three consecutive cold-metal-transfer phases 28. From this, it is apparent that several identical welding process phases of a welding process can be performed one after the other, whereupon one or several welding process phases of a further, different welding process will be carried out, said procedure being cyclically repeated.

Basically, it is also feasible for the control of the heat balance to provide automatic switching from a welding process phase to another welding process phase by detecting the temperature of the workpiece 16 and predetermining a defined heat input at the welding apparatus 1, which means that the temperature of the workpiece 16 is transmitted to the control device 4 of the welding apparatus 1, whereupon the latter decides whether switching to the cold-metal-transfer phase is indeed to be effected in order to cool the workpiece 16.

In the exemplary embodiment according to FIGS. 6 to 9, the pulse current phase 27 is started at time 37 by increasing the welding current I. Such an increase induces the formation of a droplet on the end of the welding wire. After a certain, defined time (time 38), the droplet 32 is detached from the welding wire 13, the pulse current phase 27 is then over and a base current rent I is lowered to a base value 36 in order to maintain the electric arc 15. After three consecutive pulse current phases 27 and base current phases 35, the cold-metal-transfer phase 28 is started at time 39 and the welding current I is increased by a limited extent. The welding wire 13 is then moved in the direction towards the workpiece 16 until contacting the same, i.e. until creating a short circuit. Droplet detachment is then effected in a manner that, during the rearward movement of the welding wire 13, i.e. after the occurrence of the short circuit, the droplet 32 is pulled off from the end of the welding wire due to the surface tension of the melt bath, which means that the droplet 32 is virtually pulled down from the welding wire 13 by the rearward movement of the latter. In doing so, it is, of course, possible to effect an increase, particularly a pulse-like increase, of the welding current I to promote droplet detachment. After droplet detachment, the welding wire 13 is again moved back into its starting position, i.e., as far as to the distance 30, whereby an automatic ignition of the electric arc 15 occurs due to a slight current feed after the detachment of the droplet 32 and lifting of the welding wire 13 from the workpiece 16, respectively. In this exemplary embodiment, three cold-metal-transfer phases 28 follow upon one another as already described above, whereby substantially less heat is introduced into the workpiece 16 during that period and the heat balance can, thus, be influenced during welding. As a result, the workpiece 16 is subjected to lower tensions, which will also substantially decrease the distortion of the workpiece 16.

Figure 10:
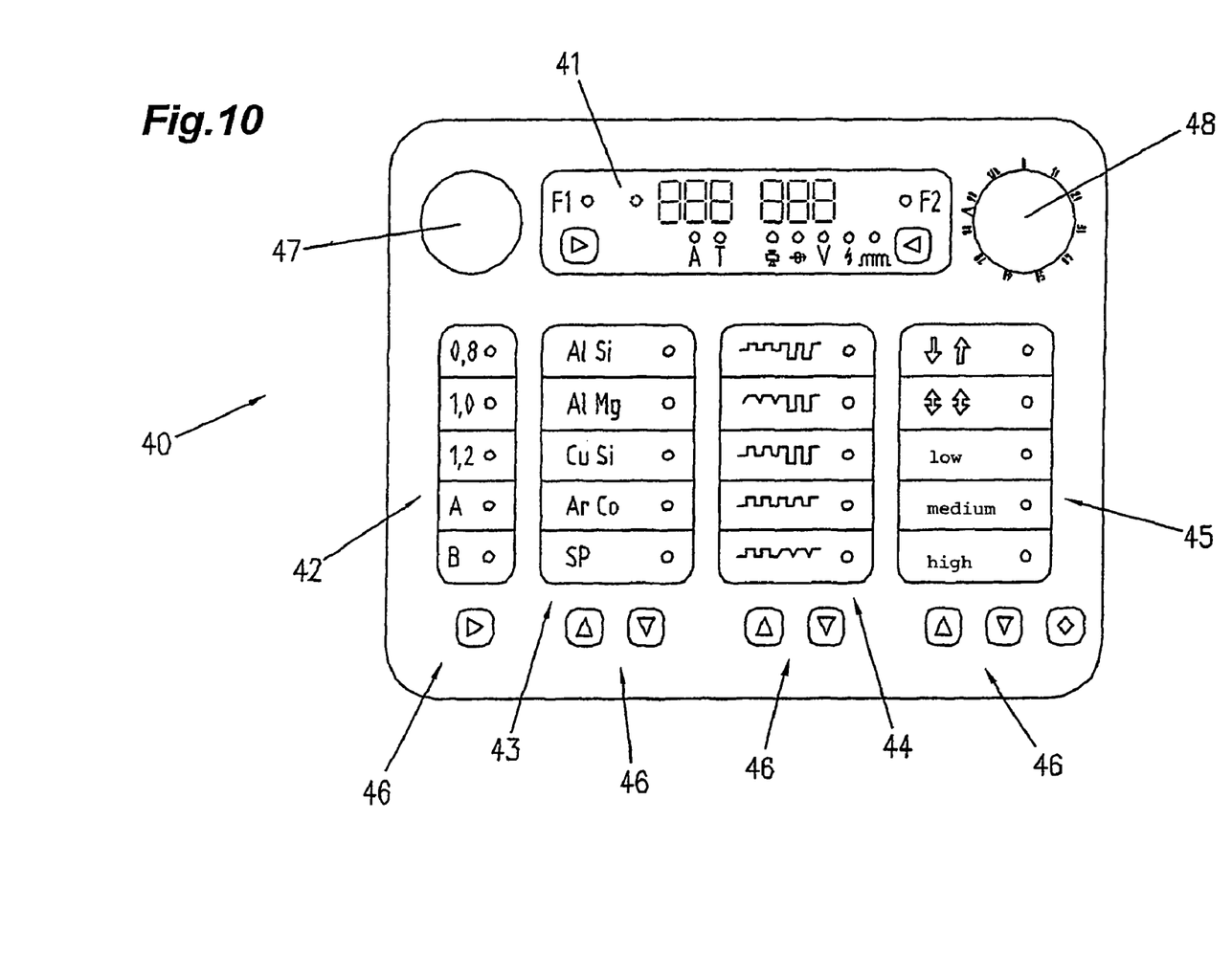
FIG. 10 shows the input and/or output device of a welding apparatus according to the invention.

A special configuration of the welding apparatus 1 to be applied or adjusted for a welding process comprised of at least two different phases is described below by way of FIG. 10. The welding apparatus comprises a welding current source or power source 2, a control device 4 and a welding torch 10. Via an input and/or output device 40, the various welding parameters are adjustable on the welding apparatus 1 or via a remote controller. At the input and/or output device 40 of the welding apparatus, and/or a remote controller, at least one parameter can be selected for the heat balance or the heat input into the workpiece to be worked, and/or an adjustment element can be provided for the adjustment of the heat balance or the heat input into two welding process phases. The set parameters are transmitted to the control device 4 of the welding apparatus 1 for the former to control the respective welding process. In the input and/or output device 40, the most different parameters for the welding process such as, for instance, the welding current I and/or the welding voltage U and/or the wire conveying speed V and/or a welding parameter for the heat input and/or the material of the workpieces 16 to be welded and/or the material of the welding wire 13 and/or the employed welding gas can be set. In addition, selection or adjustment elements 46 are provided for the adjustment of the parameters of at last two welding process phases cyclically alternating during the welding process in order to adjust and/or control the heat balance or heat input into the workpiece 16 to be worked. The ratio of the welding process phases, i.e. the number of pulses of a pulse current phase to the number of pulses of a cold-metal-transfer phase phase, or the duration of the first welding process phase to the second welding process phase, is controlled by adjusting the parameters on the welding apparatus 1. A heat-optimized welding process is, thus, realized or controlled by the simple adjustment of known welding parameters.

The effected adjustments can be read from a display 41. At the input and/or output device 40 illustrated, adjustments are made using selection or adjustment elements 46, 47, 48, which may be in the form of keys, rotary switches or potentiometers. It is, for instance, feasible to adjust the thickness of the welding wire 13 by means of first keys 46, with the respective adjustment being indicated on the display 42. By a second array of keys 46, for instance, the material of the welding wire 13 may be selected, and the adjusted material combination will be indicated via a display 43. Via a third combination of keys 46, the type of the welding process is adjusted by alternating different welding process phases, which will then be indicated on the display 44. Finally, a selection of the heat balance, i.e. the heat input into the workpiece 16, is effected via a further key combination 46, which selection is shown on the display 45. The following cyclically alternating welding process phases can be represented on the display 44: pulse current phase and cold-metal-transfer phase, short-arc welding phase and cold-metal-welding phase, pulse current phase and spray arc welding phase, and pulse current phase and short-arc welding phase. Naturally, other combinations of different welding process phases are feasible.

By a control button 47, the current intensity I or the welding voltage U, the wire advance speed V etc. may, for instance, be changed individually. By a further control button 48, the duration of a first welding process phase, e.g. a spray-arc welding phase, relative to a second welding process phase, e.g. a cold-metal-transfer phase, and/or the number of pulses of a pulse current phase prior to the changeover to the cold-metal-transfer phase can, for instance, be adjusted. The user is, thus, able to fix the duration of the first and second phases of the welding process and/or the number of pulses to be performed by the respective welding process phase before changing over to another welding process phase. The duration and number of pulses of the welding process phases having high energy inputs can, thus, be freely adjusted prior to the changeover to a phase having a low energy input.

The adjustment of the heat balance or heat input into the workpiece 16 may, however, also be effected in that the user adjusts a conventional welding process and determines the heat balance by additionally setting a further parameter like the heat input, which is indicated on the display 45 and selectable via keys 46. In doing so, the user is able to determine in a simple manner by an appropriate selection on the display 45, whether, for instance, a low, medium or high heat input is to occur so as to cause the control device 4 to perform the respective control operation. To this end, suitable data or calculation models corresponding to the individual selection options are stored to enable automatic setting.

It is, however, also feasible to, for instance, control the desired heat input into the workpiece 16 in percentages by means of the control knob 48. The control device 4 controls the ratio of the phases having low energy inputs to the phases having high energy inputs. The control knob 48 may be provided with an appropriate scale to allow the user to adjust the heat input by simple selection. The control device 4, thus, controls the ratio of the welding method having a low energy input to the welding Moreover, the duration of the individual welding phases can be controlled at the welding apparatus 1 as a function of the welding current intensity I and, in particular, in a manner directly proportional to the welding current or the adjusted power. This may be effected in that the ratio between the pulse current phase 27 and the cold-metal-transfer phase 28 is changed by the control device 4 via the control button 47 as a function of the power or current adjusted at the input and/or output device 40. For instance, this is realized in that, with a low power adjusted, i.e. at a low current such as, for instance, 50A, and with a welding process comprised of pulse current phases and cold-metal-transfer phases, a reduced number of pulse current phases 27 with high heat inputs are performed relative to an increased number of cold-metal-transfer phases 28. Less heat is, thus, introduced into the workpiece 16. However, if the user increases the power, i.e. the current to, for instance, 10A, a larger number of pulse current phases 27 will be carried out relative to the cold-metal-transfer phases 28, thus introducing more heat into the workpiece 16. The ratio of the individual phases of the welding process can be stored in the welding apparatus 1 such that the user will only have to adjust the power, whereupon the control device 4 will fix the ratio of the two alternating welding process phases.

Another option is to store data for the respective welding process in a memory integrated in the welding apparatus 1 so as to enable the control device 4 to control the welding method on the basis of these data. Thus, only a small number of adjustments have to be made by the user prior to the welding process, the control device 4 then controlling the welding process automatically. In this case, the heat balance and heat input into the workpiece 16 will, in particular, be determined by the selection of the material for the welding wire 13 and the workpieces 16 to be welded. In this regard, the respective values for the most different materials for the welding wire 13 and the workpieces 16, respectively, can be stored in the memory such that the control device 4 will determine the ratio of the alternating welding process phases as a function of the selected materials. For a welding process for aluminum, for instance, a smaller heat input into the workpiece 16 is required than would lower values are stored than for steel.

It is, of course, also possible to effect the initiation of the execution of the cold-metal-transfer phase 28 by specifying the number of pulses in the pulse current phase 27 or even by predetermining or defining a time period, or by applying a trigger signal.

It goes without saying that the individual, previously described adjustment options may be combined with one another and/or several adjustment options are provided on the welding apparatus 1.

The invention claimed is:

1. A method for controlling or adjusting a welding process using a melting electrode comprising the steps of:
    (a) igniting an electric arc;
    (b) subsequently carrying out a welding process adjusted according to several different welding parameters and controlled by a control device using a welding current source;
    wherein the welding process comprises at least a first welding process phase and a second welding process phase;
    wherein the first welding process phase has a high energy input and a first material transition and the second welding process phase comprises a cold-metal-transfer phase having a low energy input and a second material transition different from the first material transition;
    (c) cyclically combining the first and second welding process phases during the welding process to influence or control the heat input into a workpiece to be worked;
    wherein the first welding process phase has a high energy input phase and a base current phase and the second welding process phase has a short-circuit phase that starts during the base current phase;
    (d) during the cold-metal-transfer phase, conveying welding wire via a wire conveyance in the direction of the workpiece until contacting a workpiece, and subsequently reversing the wire conveyance after a short circuit has been created to move the welding wire back to a predefined distance from the workpiece; and
    (e) changing from the second welding process phase having the low energy input to the first welding process phase having the high energy input or changing from the first welding process phase having the high energy input to the second welding process phase having the low energy input during or after the short circuit or during the base current phase, during which the welding current is lowered to a base value.

2. The method according to claim 1, wherein a pulse current phase is used as said first welding process phase having a high energy input.

3. The method according to claim 2, wherein the second welding process phase having a low energy input is initiated by an action selected from the group consisting of specifying the number of pulses in the pulse current phase, predetermining a time period, and applying a trigger signal.

4. The method according to claim 1, wherein a spray-arc phase is used as said first welding process phase having a high energy input.

5. The method according to claim 1, wherein the duration of the first and second welding process phases is controlled directly proportionally to the adjusted welding current (I) or an adjusted power, respectively.

6. The method according to claim 1, wherein the ratio between the first welding process phase having a high energy input and the second welding process phase having a low energy input is changed as a function of the welding current (I) or an adjusted power, respectively.

7. The method according to claim 1, wherein at least one welding parameter of the heat input into the workpiece to be worked is selected or adjusted on a welding apparatus, with the ratio between the first welding process phase having a high energy input and the second welding process phase having a low energy input being automatically determined and controlled as a function of the selected or adjusted heat input value.

8. The method according to claim 1, wherein the ratio of the cyclically alternating first and second welding process phases is determined as a function of the parameters used for the welding process.

9. The method according to claim 1, wherein the welding process is started according to a lift-arc principle.

10. The method according to claim 1, wherein a third welding process phase having a high energy input is implemented over a defined period upon ignition of the electric arc and prior to the cyclic alternation of the at least first and second welding process phases.

11. The method according to claim 1, wherein the welding current (I) during the second welding process phase is lower than the welding current (I) during the first welding process phase.

12. The method according to claim 1, wherein the wire advance speed is changed during the first and second welding process phases.

13. The method according to claim 1, wherein the high energy input phase is a high current phase, and a ratio of the number of pulses of the first welding process phase to the number of pulses of the second welding process phase is adjusted to adjust or control the heat balance or heat input into the workpiece.

14. A welding device including a welding current source, a control device, a welding torch and a welding wire, wherein different welding parameters are adjustable via at least one device selected from the group consisting of an input device provided on the welding apparatus, an output device provided on the welding apparatus, and a remote controller, wherein an adjustment element for the adjustment of the heat balance or heat input into the workpiece to be worked, via a cyclic combination of at least a first welding process phase and a second welding process phase, is arranged on the at least one device, wherein the first welding process phase has a high energy input and a first material transition and the second welding process phase comprises a cold-metal-transfer phase having a low energy input and a second material transition different from the first material transition, wherein the first welding process phase has a high energy input phase and a base current phase and the second welding process phase has a short-circuit phase that starts during the base current phase, wherein during the cold-metal-transfer phase, the welding wire is conveyed via a wire conveyance in the direction of the workpiece until contacting the workpiece, and the wire conveyance is subsequently reversed after a short circuit has been created to move the welding wire back to a predefined distance from the workpiece, and wherein a change from the second welding process phase having the low energy input to the first welding process phase having the high energy input or a change from the first welding process phase having the high energy input to the second welding process phase having the low energy input is done during or after the short circuit or during the base current phase, during which the welding current is lowered to a base value.

15. The welding device according to claim 14, wherein a selection element is provided for the selection of the welding process phases to be used.

16. The welding device according to claim 14, wherein at least one display is provided for the representation of at least one of the selected welding parameters and the selected welding process phases.

17. The welding device according to claim 16, wherein a memory is provided for the storage of welding parameter adjustments.

18. The welding device according to claim 16, wherein the first welding process phase is a spray-arc phase and a cyclic combination of the spray-arc phase with the second welding process phase is adjustable at the at least one device.

19. The welding device according to claim 16, wherein the first welding process phase is a spray short-circuit arc welding phase and a cyclic combination of the spray short-circuit arc welding phase with the second welding process phase is adjustable at the at least one device.

20. The welding device according to claim 16, wherein an adjustment element is provided for the adjustment of the duration of the respective welding process phase.

21. The welding device according to claim 16, wherein a memory is provided for the storage of welding parameter adjustments.

22. The welding device according to claim 14, wherein a selection element is provided for the selection of the material of the workpiece to be worked.

23. The welding device according to claim 14, wherein a selection element is provided for the selection of the material of the employed welding wire.

24. The welding device according to claim 14, wherein the first welding process phase is a pulse current phase and a cyclic combination of the second welding process phase with the pulse current phase is adjustable at the at least one device.

25. The welding device according to claim 14, wherein the first welding process phase is a spray-arc phase and a cyclic combination of the second welding process phase with the spray-arc phase is adjustable at the at least one device.

26. The welding device according to claim 14, wherein an adjustment element is provided for the adjustment of the duration of the respective welding process phase.

27. The welding device according to claim 14, wherein the high energy input phase is a high current phase, and a ratio of the number of pulses of the first welding process phase to the number of pulses of the second welding process phase is adjusted to adjust or control the heat balance or heat input into the workpiece.

* * * * *